US009451600B2

(12) United States Patent
Park et al.

(10) Patent No.: US 9,451,600 B2
(45) Date of Patent: Sep. 20, 2016

(54) METHOD AND APPARATUS FOR TRANSMITTING INDICATOR IN WIRELESS COMMUNICATION SYSTEM

(71) Applicant: LG ELECTRONICS INC., Seoul (KR)

(72) Inventors: Sungjun Park, Anyang-si (KR); Seungjune Yi, Anyang-si (KR); Youngdae Lee, Anyang-si (KR); Sunghoon Jung, Anyang-si (KR); Jaewook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 14/378,853

(22) PCT Filed: Jun. 25, 2013

(86) PCT No.: PCT/KR2013/005598
§ 371 (c)(1),
(2) Date: Aug. 14, 2014

(87) PCT Pub. No.: WO2014/003412
PCT Pub. Date: Jan. 3, 2014

(65) Prior Publication Data
US 2015/0043365 A1 Feb. 12, 2015

Related U.S. Application Data

(60) Provisional application No. 61/664,180, filed on Jun. 26, 2012.

(51) Int. Cl.
*H04W 72/04* (2009.01)
*H04W 28/02* (2009.01)
(Continued)

(52) U.S. Cl.
CPC ......... *H04W 72/0413* (2013.01); *H04W 24/08* (2013.01); *H04W 28/0278* (2013.01);
(Continued)

(58) Field of Classification Search
CPC ......... H04W 72/0413; H04W 52/365; H04W 24/08; H04W 72/1215; H04W 52/0238; H04W 72/14; H04W 72/1242; H04W 52/146
USPC ....... 370/241, 252, 276, 277, 278, 282, 310, 370/328, 338, 351, 389, 412, 428; 455/403, 455/422.1, 7, 24
See application file for complete search history.

(56) References Cited

U.S. PATENT DOCUMENTS

2009/0103440 A1   4/2009   Wang et al.
2009/0196230 A1   8/2009   Kim et al.
(Continued)

FOREIGN PATENT DOCUMENTS

WO   WO 2012/021879 A2   2/2012

*Primary Examiner* — Obaidul Huq
(74) *Attorney, Agent, or Firm* — Birch, Stewart, Kolasch & Birch, LLP (57) ABSTRACT

A method and apparatus for transmitting an indicator in a wireless communication system is provided. A user equipment (UE) transmits an indicator to a base station, using at least one of a buffer status report (BSR) media access control (MAC) control element (CE) and a power headroom report (PHR) MAC CE if uplink transmission is not available. The indicator may indicates that there is no data in a buffer of the UE regardless of a current buffer status, or that there is no power headroom regardless of current power headroom status. The indicator may be a new logical channel identifier (LCID) or a new field, which indicates that the UL transmission is not available, in the at least one of the BSR MAC CE and the PHR MAC CE.

12 Claims, 7 Drawing Sheets

(51) Int. Cl.
  *H04W 76/04*   (2009.01)
  *H04W 52/02*   (2009.01)
  *H04W 52/14*   (2009.01)
  *H04W 72/14*   (2009.01)
  *H04W 72/12*   (2009.01)
  *H04W 24/08*   (2009.01)
  *H04W 52/36*   (2009.01)

(52) U.S. Cl.
  CPC ....... *H04W52/0238* (2013.01); *H04W 52/146* (2013.01); *H04W 52/365* (2013.01); *H04W 72/1215* (2013.01); *H04W 72/1242* (2013.01); *H04W 72/14* (2013.01); *H04W 76/046* (2013.01)

(56) References Cited

U.S. PATENT DOCUMENTS

| | | | |
|---|---|---|---|
| 2010/0067457 A1* | 3/2010 | Wang et al. | 370/329 |
| 2010/0098011 A1 | 4/2010 | Pelletier et al. | |
| 2010/0150082 A1 | 6/2010 | Shin et al. | |
| 2011/0044297 A1 | 2/2011 | Lee et al. | |
| 2011/0080881 A1* | 4/2011 | Hsu | 370/329 |
| 2011/0269393 A1* | 11/2011 | Ostergaard et al. | 455/7 |
| 2012/0040715 A1* | 2/2012 | Fu et al. | 455/553.1 |
| 2013/0114583 A1 | 5/2013 | Park et al. | |

* cited by examiner

METHOD AND APPARATUS FOR TRANSMITTING INDICATOR IN WIRELESS COMMUNICATION SYSTEM

CROSS REFERENCE TO RELATED APPLICATIONS

This application is the National Phase of PCT International Application No. PCT/KR2013/005598, filed on Jun. 25, 2013, which claims priority under 35 U.S.C. 119(e) to U.S. Provisional Application No. 61/664,180, filed on Jun. 26, 2012, all of which are hereby expressly incorporated by reference into the present application.

TECHNICAL FIELD

The present invention relates to wireless communications, and more particularly, to a method and apparatus for transmitting an indicator in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

In 3GPP LTE, a base station (BS) needs to know a type of data and an amount of data which each user wants to transmit for using uplink radio resources efficiently. For downlink radio resources, a BS can know an amount of data need to be transmitted to each user through downlink, since the data to be transmitted through the downlink is transferred from an access gateway to the BS. On the other hand, for uplink radio resources, if a user equipment (UE) does not inform a BS information on data to be transmitted through uplink, the BS cannot know how much uplink radio resources are required for each UE. Therefore, for a BS to allocate uplink radio resources to a UE properly, the UE is required to provide information for scheduling the uplink radio resources to the BS.

Accordingly, if there is data to be transmitted to a BS, a UE inform the BS that the UE has the data to be transmitted to the BS, and the BS allocates proper uplink radio resources to the UE based on the information. This procedure is called a buffer status reporting (BSR) procedure.

A UE needs uplink radio resources for transmitting a BSR to a BS. If the UE has allocated uplink radio resources when the BSR is triggered, the UE immediately transmits the BSR to the BS using the allocated uplink radio resources. If the UE does not have allocated uplink radio resources when the BSR is triggered, the UE performs a scheduling request (SR) procedure for receiving uplink radio resources from the BS.

Transmit power needs to be properly regulated in order for a user equipment (UE) to transmit data to a base station (BS). When the transmit power is too low, the BS may not be able to correctly receive the data. When the transmit power is too high, even though the UE can receive data without any problem, it may act as an interference to another UE for receiving data. Therefore, the BS needs to optimize power used in uplink transmission of the UE from a system aspect.

In order for the BS to regulate the transmit power of the UE, essential information must be acquired from the UE. For this, power headroom reporting (PHR) of the UE is used. A power headroom implies power that can be further used in addition to the transmit power currently used by the UE. That is, the power headroom indicates a difference between maximum possible transmit power that can be used by the UE and the currently used transmit power. Upon receiving the PHR from the UE, the BS can determine transmit power used for uplink transmission of the UE at a next time on the basis of the received PHR. The determined transmit power of the UE can be indicated by using a size of a resource block (RB) and a modulation and coding scheme (MCS), and can be used when an uplink (UL) grant is allocated to the UE at a next time. Since radio resources may be wasted if the UE frequently transmits the PHR, the UE can define a PHR trigger condition and transmit the PHR only when the condition is satisfied.

In order to allow users to access various networks and services ubiquitously, an increasing number of UEs are equipped with multiple radio transceivers. For example, a UE may be equipped with 3GPP LTE, Wi-Fi, and Bluetooth transceivers, and global navigation satellite system (GNSS) receivers. Due to extreme proximity of multiple radio transceivers within the same UE operating on adjacent frequencies or subharmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios.

When a UE experiences a level of IDC interference that cannot be solved by the UE itself and a network intervention is required, the UE transmits an IDC indication via dedicated radio resource (RRC) signaling to report the problems. The details of the IDC indication trigger may be left up to UE implementation. It may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to transmit an IDC indication. The UE may only transmit an IDC indication for E-UTRA UL/DL carriers for which a measurement object is configured.

The term "ongoing IDC interference" should be treated as a general guideline by the UE. For the serving frequency, ongoing interference consists of interference caused by aggressor radio to victim radio during either active data exchange or upcoming data activity which is expected in up to a few hundred milliseconds. For the non-serving frequency, ongoing interference is an anticipation that the LTE radio will either become aggressor or victim if it is handed over to the non-serving frequency. Ongoing interference is applicable over several subframes/slots where not necessarily all the subframes/slots are affected.

When notified of IDC problems through an IDC indication from the UE, a BS can choose to apply a frequency division multiplexing (FDM) solution or a time division multiplexing (TDM) solution:

The basic concept of an FDM solution is to move the LTE signal away from an industrial, scientific and medical (ISM) band by performing inter-frequency handover within E-UTRAN.

The basic concept of a TDM solution is to ensure that transmission of a radio signal does not coincide with reception of another radio signal. LTE discontinuous reception (DRX) mechanism is considered as a baseline to provide TDM patterns (i.e. periods during which the LTE UE may be scheduled or is not scheduled) to resolve the IDC issues. DRX based TDM solution should be used in a predictable way, i.e. the BS should ensure a predictable pattern of unscheduled periods by means of DRX mechanism.

To assist the BS in selecting an appropriate solution, all necessary/available assistance information for both FDM and TDM solutions is transmitted together in the IDC indication to the BS. The IDC assistance information contains the list of E-UTRA carriers suffering from ongoing interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC interference. A prohibit mechanism is used to restrict the interval at which the UE transmits the IDC indication. In case of inter-eNB handover, the IDC assistance information is transferred from the source BS to the target BS.

From the start of IDC interference detection to the delivery of the corresponding IDC indication to the network, it is up to the UE whether radio resource management (RRM) measurements reflect IDC interference. After the successful transmission of the IDC indication though, the UE shall ensure that RRM measurements are free of IDC interference.

In addition, the UE can autonomously deny LTE transmission to protect ISM in rare cases if other solutions cannot be used. Conversely, it is assumed that the UE also autonomously denies ISM transmission in order to ensure connectivity with the eNB to perform necessary procedures to resolve IDC problems. The use of autonomous denials is not limited to handover scenarios. There could be a limit on the amount of denials known to both UE and eNB.

As describe above, if a UE has some data to transmit, the UE may transmit a BSR to a BS. Based on the information from the received BSR, the BS may allocate UL grants to the UE. Then, the UE can transmit the data by using the allocated UL grants.

However, if the UE needs to deny the UL grants to protect the ISM transmissions, the allocated UL grants will be just wasted because they cannot be used by the other UEs.

Therefore, it is important to minimize the impact of the autonomous denials that results in waste of the UL resources.

SUMMARY OF INVENTION

Technical Problem

The present invention provides a method and apparatus for transmitting an indicator in a wireless communication system. The present invention provides a method for transmitting an indicator indicating that uplink (UL) transmission is not available using at least one of buffer status report (BSR) media access control (MAC) control element (CE) and a power headroom report (PHR) MAC CE.

Solution to Problem

In an aspect, a method for transmitting, by a user equipment (UE), an indicator in a wireless communication system is provided. The method includes determining whether uplink (UL) transmission is available or not, and if it is determined that the UL transmission is not available, transmitting an indicator to a base station, using at least one of a buffer status report (BSR) media access control (MAC) control element (CE) and a power headroom report (PHR) MAC CE.

The indicator may indicate that there is no data in a buffer of the UE regardless of a current buffer status. The indicator may be a buffer size field, which is set to 0, in the BSR MAC CE.

The indicator may indicate that there is no power headroom regardless of current power headroom status. The indicator may be a power headroom field, which is set to 0, in the PHR MAC CE.

The indicator may be a new logical channel identifier (LCID), which indicates that the UL transmission is not available, in the at least one of the BSR MAC CE and the PHR MAC CE.

The indicator may be a new field, which indicates that the UL transmission is not available, in the at least one of the BSR MAC CE and the PHR MAC CE. The new field may be set to 1.

The UL transmission may be not available when in-device coexistence (IDC) interference occurs.

The method may further include triggering at least one of a BSR and a PHR, receiving uplink radio resources from the base station through a UL grant, and transmitting at least one of a BSR and a PHR to the base station through the uplink radio resources if it is determined that the UL transmission is available.

In another aspect, a user equipment (UE) in a wireless communication system is provided. The UE includes a radio frequency (RF) unit for transmitting or receiving a radio signal, and a processor coupled to the RF unit and configured for determining whether uplink (UL) transmission is available or not, and if it is determined that the UL transmission is not available, transmitting an indicator to a base station, using at least one of a buffer status report (BSR) media access control (MAC) control element (CE) and a power headroom report (PHR) MAC CE.

Advantageous Effects of Invention

Waste of radio resources can be prevented when UL transmission is not available.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
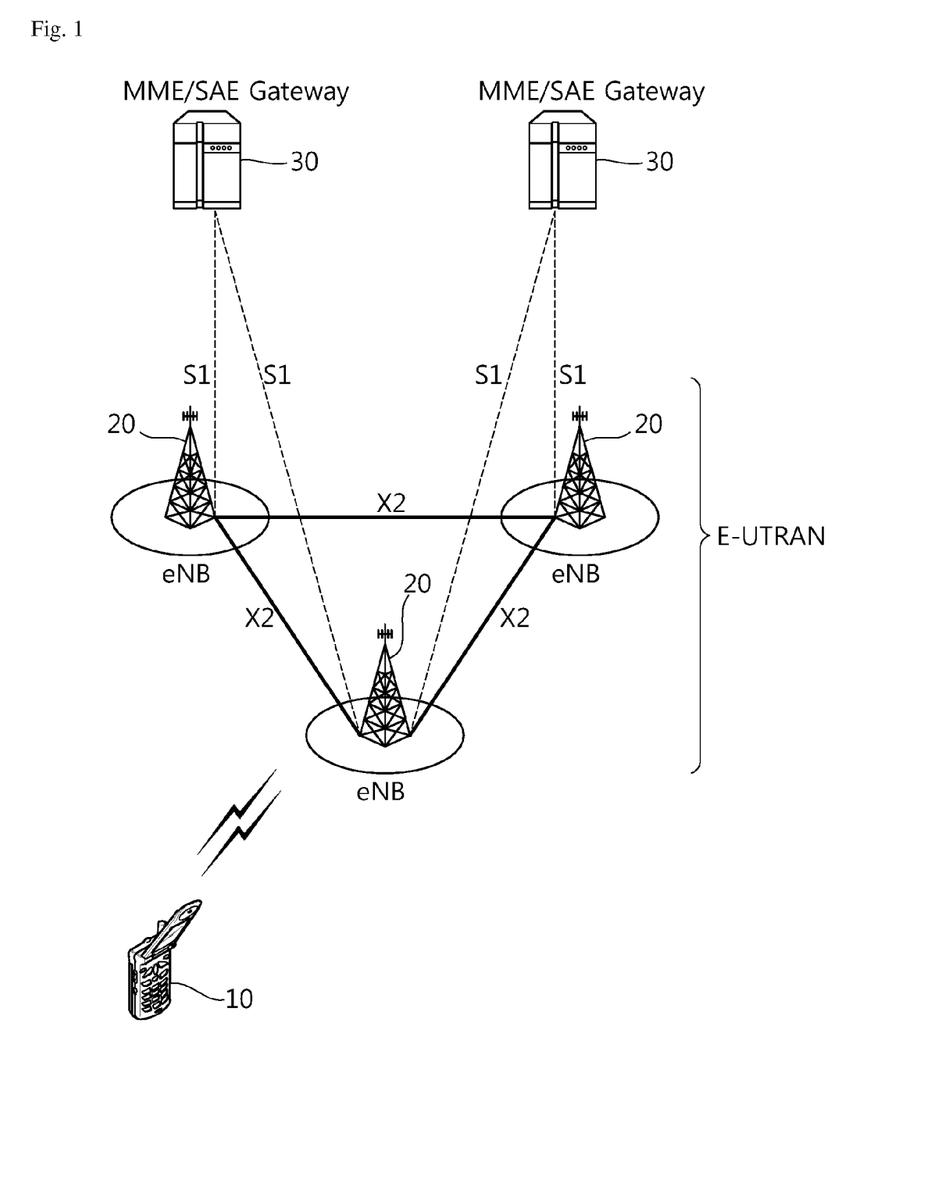
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE 10 and the BS 20 may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
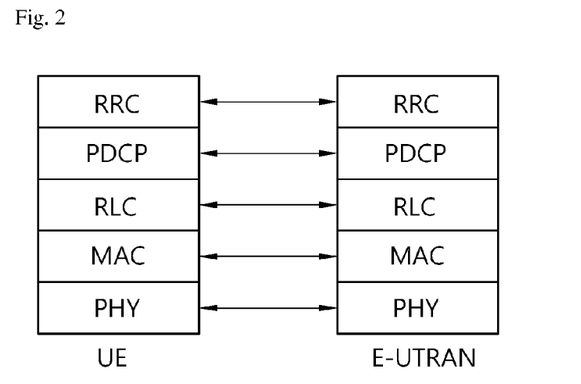
FIG. 2 is a diagram showing a radio interface protocol architecture for a control plane.
Figure 3:
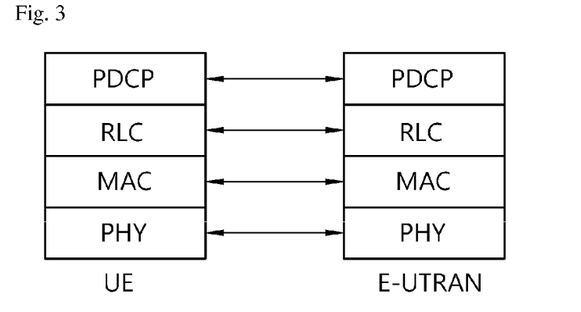
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN are classified into a first layer (L1), a second layer (L2), and a third layer (L3) based on the lower three layers of the open system interconnection (OSI) model that is well-known in the communication system. The radio interface protocol between the UE and the EUTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

Figure 4:
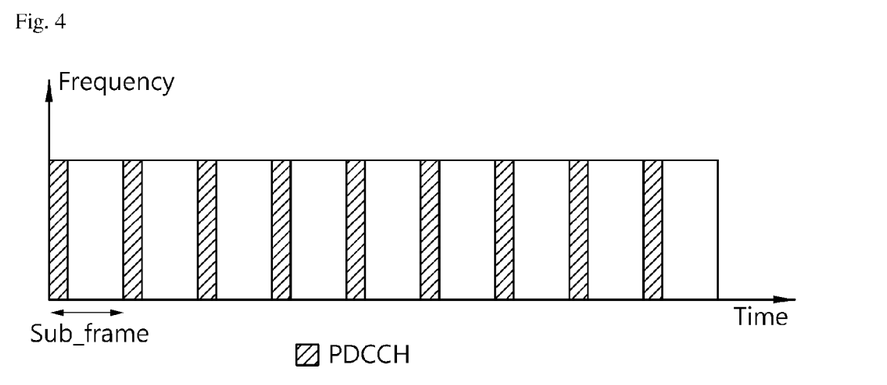
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a physical downlink control channel (PDCCH). For example, a first symbol of the subframe may be used for the PDCCH. A transmission time interval (TTI) which is a unit time for data transmission may be equal to a length of one subframe.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel may be divided into a control channel for delivering information of the control plane and a traffic channel for delivering information of the user plane.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A power headroom reporting (PHR) procedure of a user equipment is described. It may be referred to Section 5.4.6 of 3GPP TS 36.321 V8.12.0 (2012-03).

The PHR procedure is used to provide the serving eNB with information about the difference between the nominal UE maximum transmit power and the estimated power for uplink shared channel (UL-SCH) transmission. The RRC controls the PHR by configuring the two timers periodicPHR-Timer and prohibitPHR-Timer, and by signalling dl-PathlossChange which sets the change in measured downlink pathloss to trigger a PHR.

The PHR may be triggered if any of the following events occur:
  prohibitPHR-Timer expires or has expired and the path loss has changed more than dl-PathlossChange dB since the transmission of a PHR when UE has UL resources for new transmission;
  periodicPHR-Timer expires;
  upon configuration or reconfiguration of the power headroom reporting functionality by upper layers, which is not used to disable the function.

If the UE has UL resources allocated for new transmission for this TTI:
  if it is the first UL resource allocated for a new transmission since the last MAC reset, start periodicPHR-Timer;
  if the PHR procedure determines that at least one PHR has been triggered since the last transmission of a PHR or this is the first time that a PHR is triggered, and;
  if the allocated UL resources can accommodate a PHR MAC control element plus its subheader as a result of logical channel prioritization:
  obtain the value of the power headroom from the physical layer;
  instruct the multiplexing and assembly procedure to generate and transmit a PHR MAC control element based on the value reported by the physical layer;
  start or restart periodicPHR-Timer;
  start or restart prohibitPHR-Timer;
  cancel all triggered PHR(s).

Figure 5:
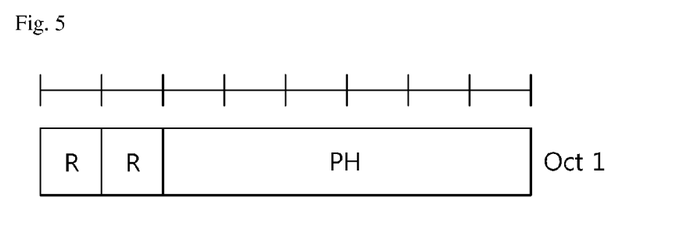
FIG. 5 shows an example of a PHR MAC CE.

FIG. 5 shows an example of a PHR MAC CE.

The UE may transmit the PHR through the PHR MAC CE to the BS. The PHR MAC CE is identified by a MAC PDU subheader with LCID. The LCID may be allocated for the PHR MAC CE in the UL-SCH, and a value of the LCID may be 11010. It has a fixed size and consists of a single octet defined as follows:

R: reserved bit, set to "0";
Power headroom (PH): this field indicates the power headroom level. The length of the field is 6 bits, so total 64 power headroom levels may be indicated. Table 1 shows the reported PH and the corresponding power headroom levels.

TABLE 1

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

A buffer status reporting (BSR) is described below. It may be referred to Section 5.4.5 of 3GPP TS 36.321 V10.5.0 (2012-03).

A BSR procedure is used to provide a serving eNB with information about an amount of data available for transmission in UL buffers of a UE. An RRC may control the BSR reporting by configuring two timers periodicBSR-Timer and retxBSR-Timer and by, for each logical channel, optionally signalling logicalChannelGroup which allocates the logical channel to a logical channel group (LCG).

For the BSR procedure, the UE may consider all radio bearers which are not suspended and may consider radio bearers which are suspended.

Buffer status report (BSR) MAC control element (CE)s may consist of either:
  short BSR and truncated BSR format: one LCG ID field and one corresponding buffer size field; or
  long BSR format: four buffer size fields, corresponding to LCG IDs #0 through #3.

The BSR formats may be identified by MAC PDU subheaders with LCIDs.

Figure 6:
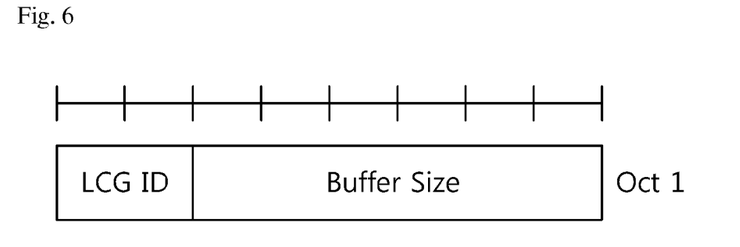
FIG. 6 shows a short BSR and truncated BSR MAC CE.
Figure 7:
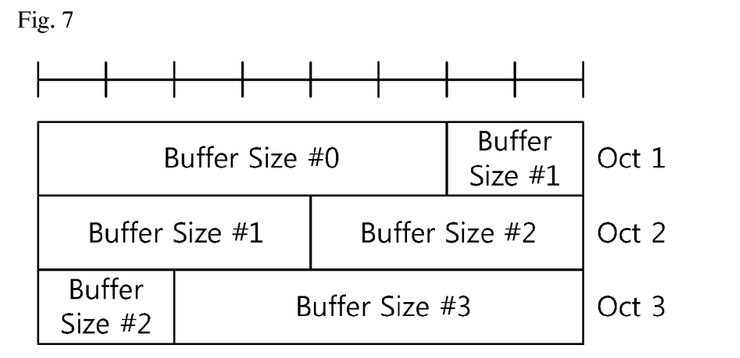
FIG. 7 shows a long BSR MAC CE.

FIG. 6 shows a short BSR and truncated BSR MAC CE.
FIG. 7 shows a long BSR MAC CE.

The LCG ID field and the buffer size field may be defined as follow:

LCG ID: The LCG ID field identifies a group of logical channel(s) which buffer status is being reported. The length of the field is 2 bits;

Buffer size: The buffer size field identifies total amount of data available across all logical channels of a logical channel group after all MAC PDUs for the TTI have been built. The amount of data is indicated in number of bytes. It may include all data that is available for transmission in an RLC layer and in a PDCP layer. A size of RLC and MAC headers are not considered in the buffer size computation. The length of this field is 6 bits. If extendedBSR-Sizes is not configured, the values taken by the buffer size field are shown in Table 2. If extendedBSR-Sizes is configured, the values taken by the buffer size field are shown in Table 3.

TABLE 2

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 3

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |

TABLE 3-continued

| Index | Buffer Size (BS) value [bytes] |
|---|---|
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Table 2 and Table 3 show buffer size levels for a BSR. Table 2 and Table 3 show a size of a buffer in which data of a LCG, which is available for transmission and is indicated from an RLC layer and a PDCP layer to a MAC layer, is stored. The size of the buffer is indicated by indexed levels. Referring to Table 2, a size of buffer in which data of one LCG, which is available for transmission, is stored is indicated from 0 to 150 kB and up to more than 150 kB (corresponding to index 63).

The BSR procedure may be triggered if any of the following events occur:

UL data, for a logical channel which belongs to a LCG, becomes available for transmission in an RLC entity or in an PDCP entity (to be described below), and either the data belongs to a logical channel with higher priority than priorities of logical channels which belong to any LCG and for which data is already available for transmission, or there is no data available for transmission for any of logical channels which belong to a LCG, in which case the BSR is referred below to as "regular BSR";

UL resources are allocated and number of padding bits is equal to or larger than a size of a buffer status report MAC control element (CE) plus its subheader, in which case the BSR is referred below to as "padding BSR";

retxBSR-Timer expires and the UE has data available for transmission for any of logical channels which belong to a LCG, in which case the BSR is referred below to as "regular BSR";

periodicBSR-Timer expires, in which case the BSR is referred below to as "periodic BSR".

For the regular BSR and the periodic BSR:
if more than one LCG has data available for transmission in the TTI where the BSR is transmitted: report a long BSR;
else report a short BSR.

For the padding BSR:
if the number of padding bits is equal to or larger than a size of a short BSR plus its subheader but smaller than a size of a long BSR plus its subheader:
if more than one LCG has data available for transmission in the TTI where the BSR is transmitted: report a truncated BSR of the LCG with the highest priority logical channel with data available for transmission;
else report a short BSR.
else if the number of padding bits is equal to or larger than a size of a long BSR plus its subheader, report a long BSR.

If the BSR procedure determines that at least one BSR has been triggered and not cancelled:
if the UE has UL resources allocated for new transmission for this TTI:
instruct multiplexing and assembly procedure to generate the BSR MAC CE(s);
start or restart periodicBSR-Timer except when all the generated BSRs are truncated BSRs;
start or restart retxBSR-Timer.
else if a regular BSR has been triggered:
if an uplink grant is not configured or the regular BSR was not triggered due to data becoming available for transmission for a logical channel for which logical channel SR masking (logicalChannelSR-Mask) is setup by upper layers:
a scheduling request shall be triggered.

A MAC PDU may contain at most one MAC BSR CE, even when multiple events trigger a BSR by the time a BSR can be transmitted in which case the regular BSR and the periodic BSR shall have precedence over the padding BSR.

The UE may restart retxBSR-Timer upon indication of a grant for transmission of new data on any UL-SCH.

All triggered BSRs may be cancelled in case the UL grant(s) in this subframe can accommodate all pending data available for transmission but is not sufficient to additionally accommodate the BSR MAC CE plus its subheader. All triggered BSRs may be cancelled when a BSR is included in a MAC PDU for transmission.

The UE may transmit at most one regular/periodic BSR in a TTI. If the UE is requested to transmit multiple MAC PDUs in a TTI, it may include a padding BSR in any of the MAC PDUs which do not contain a regular/periodic BSR.

All BSRs transmitted in a TTI may always reflect a buffer status after all MAC PDUs have been built for this TTI. Each LCG may report at the most one buffer status value per TTI and this value may be reported in all BSRs reporting buffer status for this LCG.

Data available for transmission is described below.

Data available for transmission in an RLC layer is described. It may be referred to Section 4.5 of 3GPP TS 36.322 V10.0.0 (2010-12).

For the purpose of MAC BSR procedure, the UE may consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and a status prohibit timer is not running or has expired, the UE may estimate a size of the STATUS PDU that will be transmitted in the next transmission opportunity, and consider this as data available for transmission in the RLC layer.

Data available for transmission in a PDCP layer is described. It may be referred to Section 4.5 of 3GPP TS 36.323 V10.0.0 (2010-12).

For the purpose of MAC BSR procedure, the UE may consider PDCP control PDUs, as well as the following as data available for transmission in the PDCP layer:

For SDUs for which no PDU has been submitted to lower layers:
the SDU itself, if the SDU has not yet been processed by PDCP, or
the PDU if the SDU has been processed by PDCP.

In addition, for radio bearers that are mapped on RLC AM, if the PDCP entity has previously performed a re-establishment procedure, the UE may also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by a PDCP status report, if received:
the SDU, if it has not yet been processed by PDCP, or
the PDU once it has been processed by PDCP.

A scheduling request (SR) is described below. It may be referred to Section 5.4.4 of 3GPP TS 36.321 V10.5.0 (2012-03).

An SR is used for requesting UL-SCH resources for new transmission.

When an SR is triggered, it may be considered as pending until it is cancelled. All pending SR(s) may be cancelled and sr-ProhibitTimer may be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a random access procedure and cancel all pending SRs;
else if the UE has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct a physical layer to signal the SR on PUCCH;
start the sr-ProhibitTimer.
else:
notify RRC to release PUCCH/SRS;
clear any configured downlink assignments and uplink grants;
initiate a random access procedure and cancel all pending SRs.

That is, an SR may be performed in two ways, which includes a method using a dedicated scheduling request (D-SR) channel set on a PUCCH resource and a method using a random access procedure. When a BSR is triggered, the UE triggers an SR for transmitting the BSR. In addition, if a D-SR channel is allocated when the SR is triggered, the UE transmits a radio resource allocation request using the D-SR channel. If the D-SR channel is not allocated when the SR is triggered, the UE starts a random access procedure.

Figure 8:
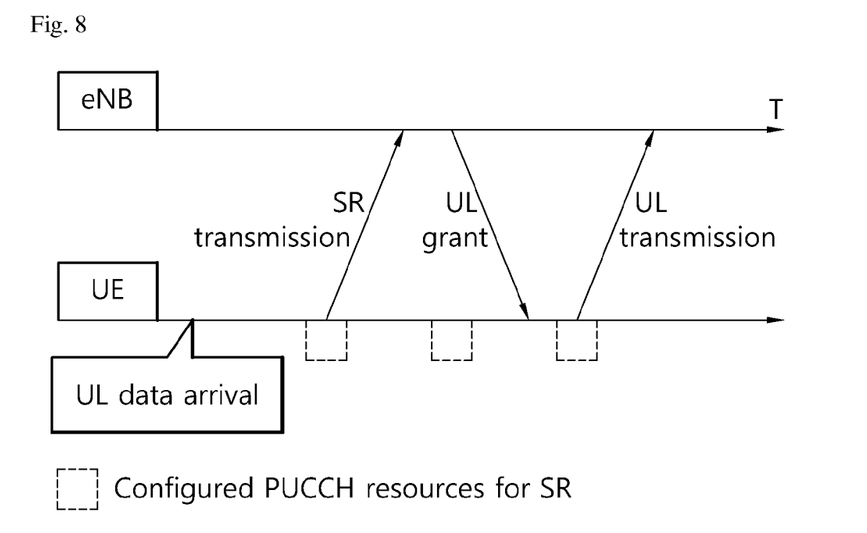
FIG. 8 shows an example of an SR procedure.

FIG. 8 shows an example of an SR procedure.

Referring to FIG. 8, a method for performing an SR procedure through a D-SR channel is described. A BS allocates D-SR channels, having regular intervals, to a UE. If UL data arrives, the UE triggers a BSR. If the UE does not have allocated radio resources, the UE triggers an SR. After, the UE performs an SR procedure through the D-SR channels. Upon receiving the SR from the UE, the BS determines resource distribution and informs the UE allocated uplink radio resources to the UE through a PDCCH according to a scheduling algorithm. If the D-SR channels are not allocated to the UE, the UE performs an SR procedure through a random access procedure.

A logical channel prioritization (LCP) is described. It may be referred to Section 5.4.3.1 of 3GPP TS 36.321 V10.5.0 (2012-03).

The LCP procedure is applied when a new transmission is performed.

The RRC controls the scheduling of uplink data by signalling for each logical channel: priority where an increasing priority value indicates a lower priority level, prioritisedBitRate which sets the prioritized bit rate (PBR), and bucketSizeDuration which sets the bucket size duration (BSD).

The UE shall maintain a variable Bj for each logical channel j. Bj shall be initialized to zero when the related logical channel is established, and incremented by the product PBR×TTI duration for each TTI, where PBR is prioritized bit rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following LCP procedure when a new transmission is performed. The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: The UE shall decrement Bj by the total size of MAC SDUs served to logical channel j in Step 1. The value of Bj can be negative.

Step 3: If any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources;
if the UE segments an RLC SDU from the logical channel, it shall maximize the size of the segment to fill the grant as much as possible;
the UE should maximize the transmission of data.
if the UE is given an UL grant size that is equal to or larger than 4 bytes while having data available for transmission, the UE shall not transmit only padding BSR and/or padding (unless the UL grant size is less than 7 bytes and an AMD PDU segment needs to be transmitted).

The UE shall not transmit data for a logical channel corresponding to a radio bearer that is suspended.

For the LCP procedure, the UE shall take into account the following relative priority in decreasing order:
MAC control element for C-RNTI or data from UL-CCCH;
MAC control element for BSR, with exception of BSR included for padding;
MAC control element for PHR;
data from any Logical Channel, except data from UL-CCCH;
MAC control element for BSR included for padding.

In-device coexistence (IDC) interference will be described.

Figure 9:
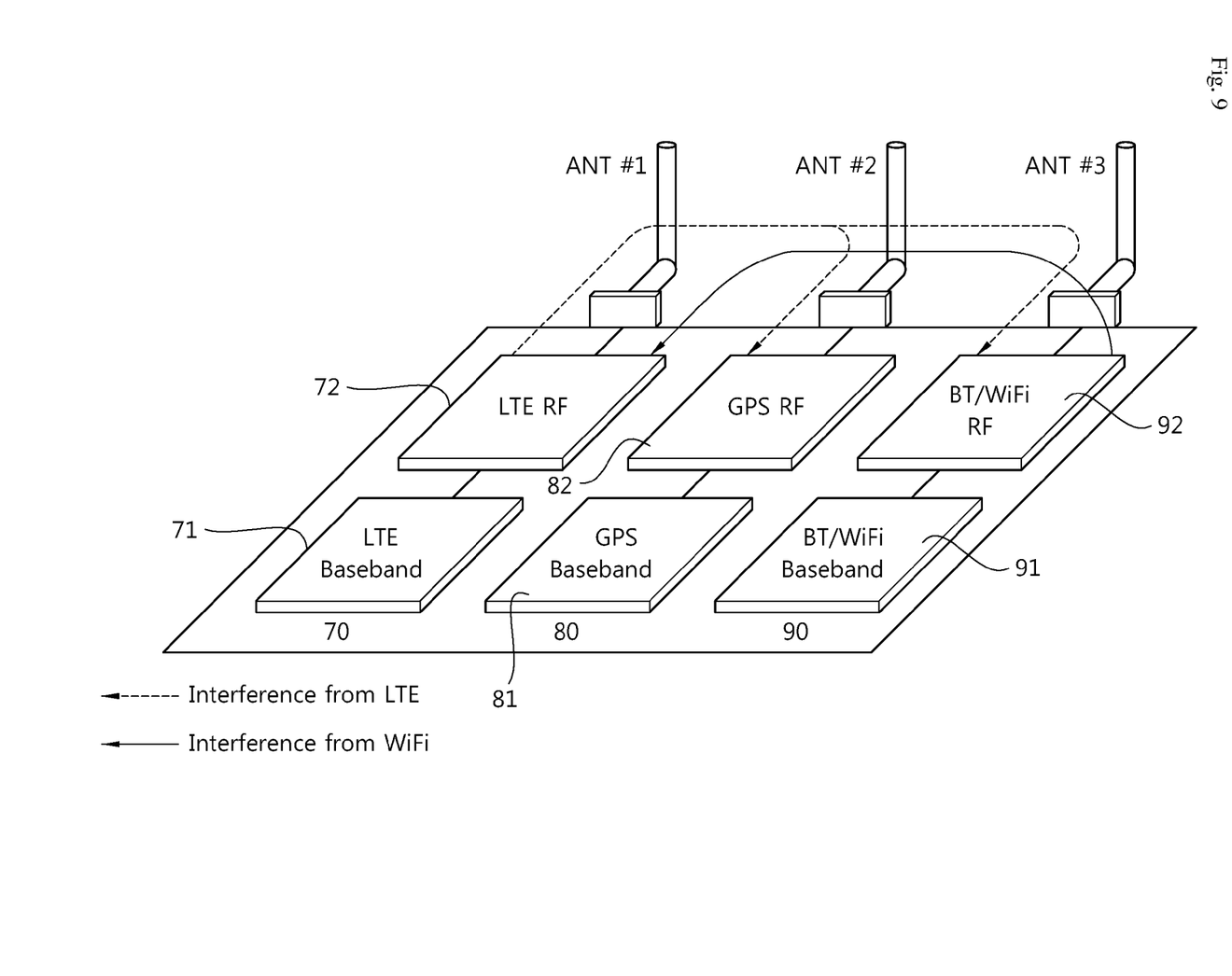
FIG. 9 shows an example of coexistence interference within the same UE.

FIG. 9 shows an example of coexistence interference within the same UE.

A LTE module 70 includes a LTE baseband 71 and a LTE radio frequency (RF) 72.

A GPS module 80 includes a GPS baseband 81 and a GPS RF 82. A Bluetooth/Wi-Fi module 90 includes a Bluetooth/Wi-Fi baseband 91 and a Bluetooth/Wi-Fi RF 92.

Different radio access technologies (RATs) within the same UE operating on adjacent frequencies cause interference to each other. For example, if all of the LTE module 70, the GPS module 80 and the Bluetooth/Wi-Fi module 90 are switched on, the LTE module 70 may interfere the GPS module 80 and the Bluetooth/Wi-Fi module 90. Or the Bluetooth/Wi-Fi module 90 may interfere the LTE module 70. The LTE module 70 can measure the IDC interference by cooperating with other radio modules or by inter/intra frequency measurements.

Coexistence scenarios are due to adjacent frequencies between different radio technologies. To describe coexistence interference scenarios between LTE radio and other radio technologies, 3GPP frequency bands around 2.4 GHz industrial, scientific and medical (ISM) bands are considered.

Figure 10:
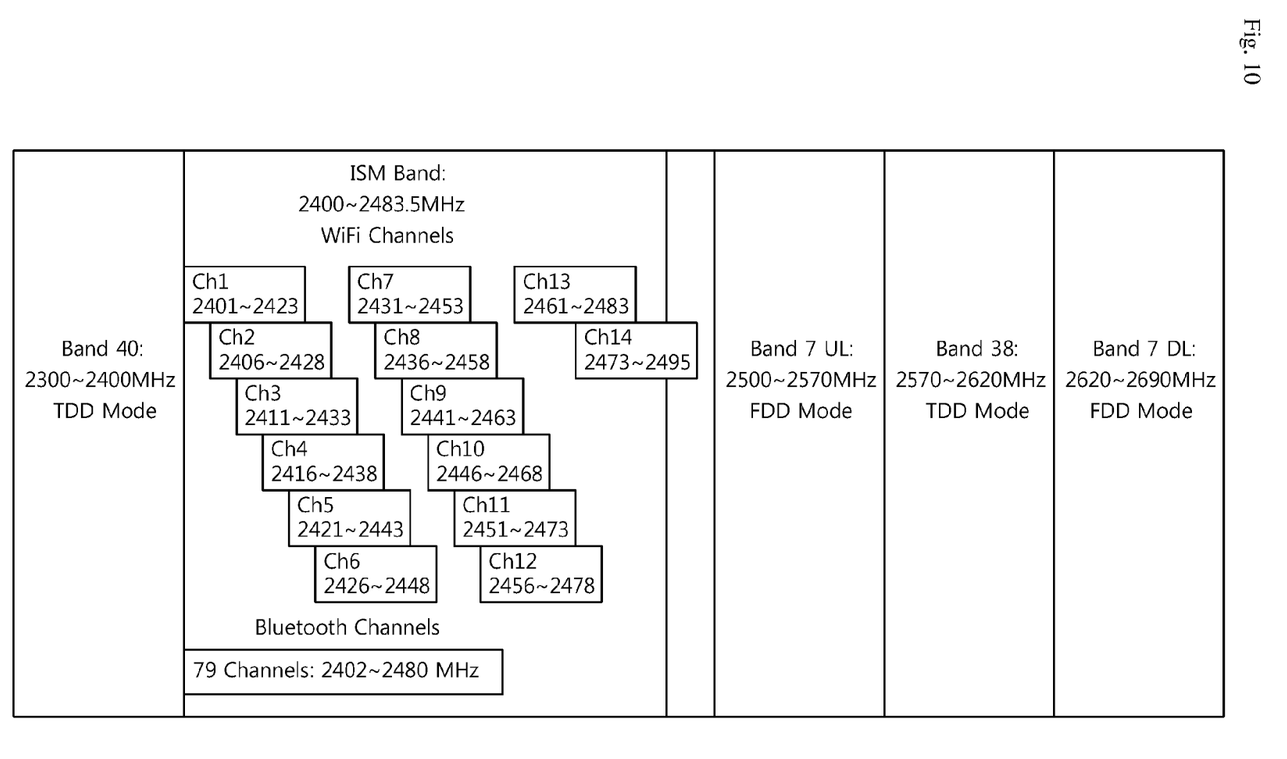
FIG. 10 shows 3GPP frequency bands around ISM band.

FIG. 10 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

The transmitter of LTE band 7/13/14 may cause interference to the receiver of GNSS at 1575.42 MHz.

As described above, a UE triggers a BSR and/or a PHR according to BSR trigger conditions and/or PHR trigger conditions. A BS allocates UL radio resources to the UE according to received BSR and/or PHR. The UE performs UL transmission through allocated UL radio resources.

It may happen that the UE cannot perform UL transmission to the BS due to IDC interference within the UE or battery remains of the UE, etc. However, the BS cannot know that the UE cannot perform UL transmission, and accordingly, the BS allocates UL radio resources to the UE. The UE cannot perform UL transmission, and allocated UL radio resources can be wasted.

To solve the problem described above, a method for indicating a BS that UL transmission is not available according to embodiments of the present invention. According to embodiments of the present invention, a UE transmits an indicator indicating that UL transmission is not available to a BS. The indicator may be transmitted when a BSR and/or PHR is triggered. In this case, the indicator may be transmitted using a BSR MAC CE and/or PHR MAC CE. The indicator may be transmitted when the UE receives UL radio resources from the BS. The UL transmission may be not available when IDC interference within the UE occurs. If the UE can perform UL transmission, the UE may transmit a BSR and/or PHR to the BS without including the indicator.

Various methods for transmitting the indicator can be proposed according to embodiments of the present invention.

1) Empty BSR/Empty PHR

If the UL transmission is not available, regardless of current buffer status and/or current power headroom status, the UE may indicate the BS that there is no data buffered and/or there is no power headroom. That is, although the UE has some data or some power headroom, the UE may report BSR/PHR indicating that there is no data in the UE's buffer or there is no power headroom. For example, it is assumed that the UE has 100 bytes of data in the buffer. If the UL transmission is not available since IDC interference situation happens, even if the UE's buffer has 100 bytes of data, the UE sets the BSR indicating that there is no data in the UE's buffer, and transmits the BSR. More specifically, the UE may set a buffer size field of a BSR MAC CE to 0. In case of the PHR, if it is determined that the UL transmission is not available, the UE sets the PHR indicating that there is no power headroom, and transmits the PHR. More specifically, the UE may set a PH field of a PHR MAC CE to 0. Alternatively, special code points in a buffer status table, described in Table 2 and Table 3, or a power headroom table, described in Table 1, can be used for this purpose.

2) New LCID for Existing BSR MAC CE/PHR MAC CE

If the UL transmission is not available, when the UE needs to report BSR/PHR (i.e., when BSR/PHR is triggered), the UE may use a new LCID for transmitting a BSR MAC CE and/or PHR MAC CE. The new LCID in the BSR MAC CE and/or PHR MAC CE may indicate that the UE performs UL transmission in a situation that UL transmission is not available. Accordingly, when the BS receives the BSR/PHR, the BS can determine whether the UE cannot perform UL transmission due to IDC interference, etc.

3) Extension of Existing BSR MAC CE/PHR MAC CE

If the UL transmission is not available, the existing BSR MAC CE/PHR MAC CE may be extended to indicate whether that UL transmission is available or not. For this, a new field may be included in the existing BSR MAC CE/PHR MAC CE, and the new field may be used for indicating that the UE performs UL transmission in a situation that UL transmission is not available. More specifically, a UL transmission status field may be included in the existing BSR MAC CE/PHR MAC CE. The UL transmission status field may be set to 1 when the UL transmission is not available. Or, the UL transmission status field may be set to 0 when the UL transmission is available.

Figure 11:
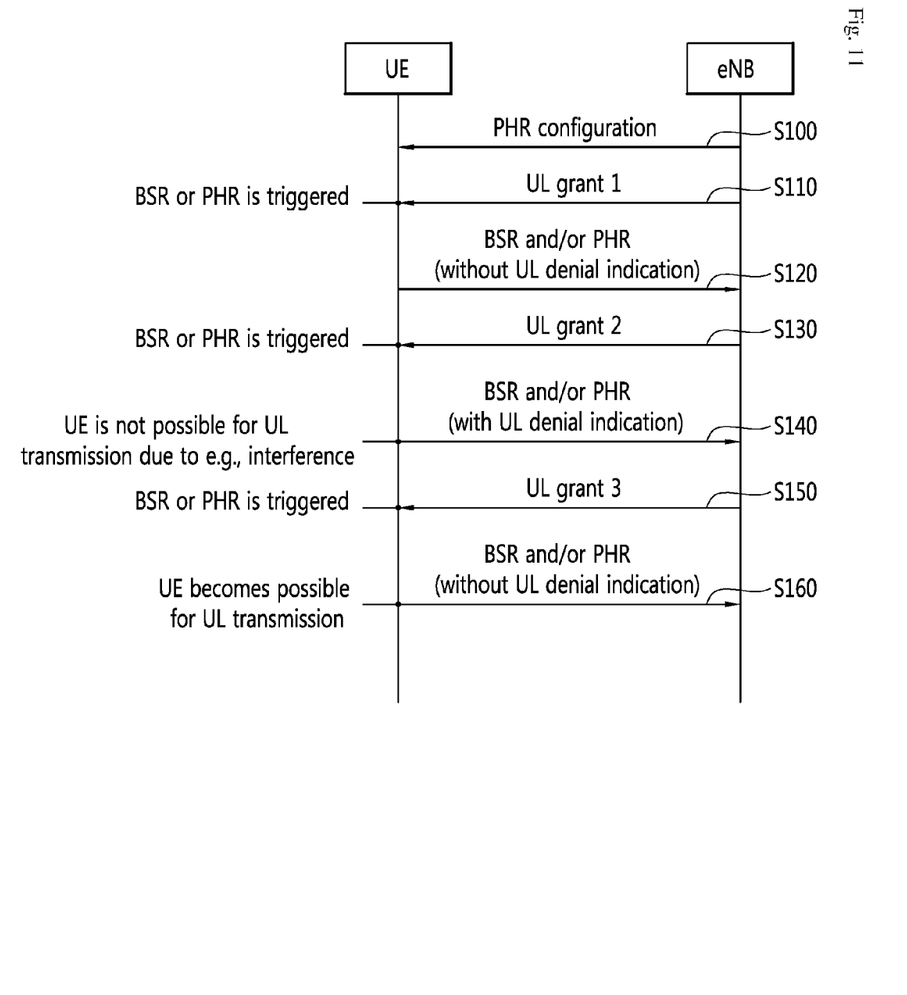
FIG. 11 shows an example of a method for transmitting an indicator according to an embodiment of the present invention.

FIG. 11 shows an example of a method for transmitting an indicator according to an embodiment of the present invention.

At step S100, a UE receives a PHR configuration from a BS. If the UE transmits an indicator using a BSR only, step S100 may be omitted.

At step S110, the UE receives a first UL grant from the BS. The UE triggers a BSR or PHR.

It is assumed that the UE can perform UL transmission normally since a problem such as IDC interference within the UE, etc, does not happen. Accordingly, at step S120, the UE transmits a BSR or PHR without indicating the BS that the UE cannot perform UL transmission. According to a method 1) describe above, the UE transmits a BSR or PHR based on current buffer status and/or current power headroom status of the UE. According to a method 2) describe above, the UE transmits a BSR or PHR using a current LCID. According to a method 3) describe above, the UE transmits a BSR or PHR including a UL transmission status field set to 0.

At step S130, the UE receives a second UL grant from the BS. The UE triggers a BSR or PHR.

It is assumed that the UE cannot perform UL transmission normally due to a problem such as IDC interference within the UE, etc. Accordingly, at step S140, the UE indicates the BS that the UE cannot perform UL transmission. According to a method 1) describe above, the UE transmits a BSR or PHR indicating that there is no data buffered and/or there is no power headroom regardless of current buffer status and/or current power headroom status. In case of the BSR, the buffer size field in the BSR MAC CE may be set to 0. In case of the PHR, the PH field in the PHR MAC CE may be set to 0. According to a method 2) describe above, the UE transmits a BSR or PHR using a new LCID indicating that the UE performs UL transmission in a situation that UL transmission is not available. According to a method 3) describe above, the UE transmits a BSR or PHR including a UL transmission status field set to 1.

At step S150, the UE receives a third UL grant from the BS. The UE triggers a BSR or PHR.

It is assumed that the UE can perform UL transmission normally since a problem such as IDC interference within the UE, etc, disappears. Accordingly, at step S160, the UE transmits a BSR or PHR without indicating the BS that the UE cannot perform UL transmission. According to a method 1) describe above, the UE transmits a BSR or PHR based on current buffer status and/or current power headroom status of the UE. According to a method 2) describe above, the UE transmits a BSR or PHR using a current LCID. According to a method 3) describe above, the UE transmits a BSR or PHR including a UL transmission status field set to 0.

Figure 12:
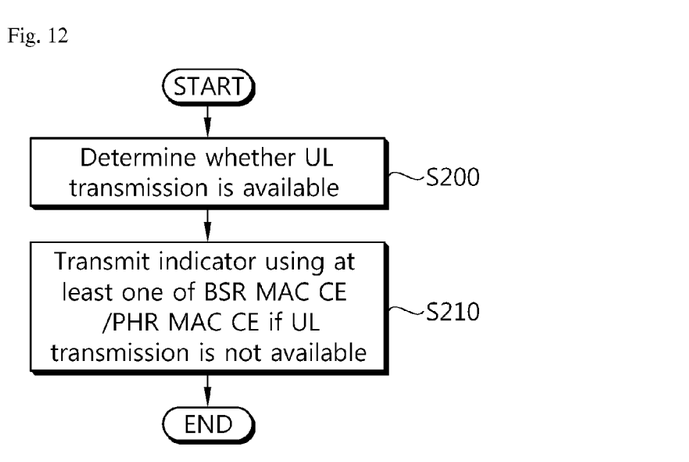
FIG. 12 shows another example of a method for transmitting an indicator according to an embodiment of the present invention.

FIG. 12 shows another example of a method for transmitting an indicator according to an embodiment of the present invention.

At step S200, a UE determines whether UL transmission is available or not. If it is determined that the UL transmission is not available due to a problem such as IDC interference, etc, at step S210, the UE transmits an indicator to a base station, using at least one of a BSR MAC CE and PHR MAC CE. As described above, the indicator may indicate that there is no data in a buffer of the UE regardless of a current buffer status, or that there is no power headroom regardless of current power headroom status, using a buffer size field in the BSR MAC CE or a PH field in the PHR MAC CE. Or, the indicator may use a new LCID, which indicates that the UL transmission is not available, in the at least one of the BSR MAC CE and the PHR MAC CE. Or, the indicator may use a new field, which indicates that the UL transmission is not available, in the at least one of the BSR MAC CE and the PHR MAC CE. If the problem such as IDC interference, etc, disappears, the UE triggers at least one of a BSR and a PHR, receives uplink radio resources from the base station through a UL grant, and transmits at least one of a BSR and a PHR to the base station through the uplink radio resources.

According to embodiments of the present invention, waste of uplink radio resources may be prevented when the UE cannot perform UL transmission.

Figure 13:
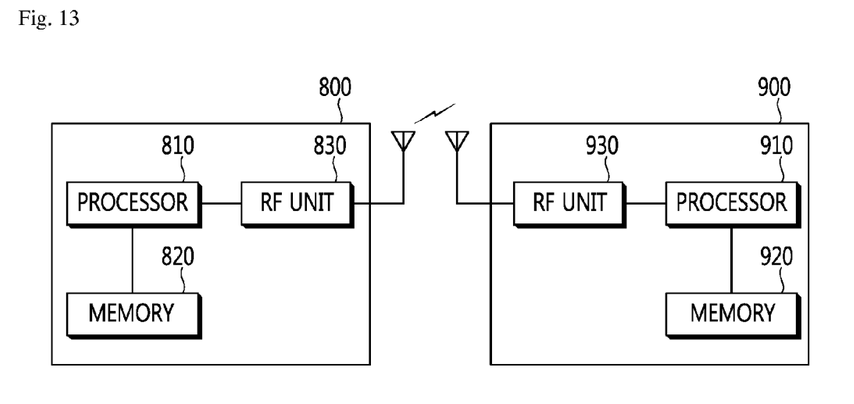
FIG. 13 is a block diagram showing wireless communication system to implement an embodiment of the present invention.

FIG. 13 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a user equipment (UE), an indicator in a wireless communication system, the method comprising:
    determining whether an uplink (UL) transmission is available or not; and
    if it is determined that the UL transmission is not available, transmitting the indicator to a base station, using at least one of a buffer status report (BSR) media access control (MAC) control element (CE) and a power headroom report (PHR) MAC CE,
    wherein if the UE uses the BSR MAC CE for transmitting the indicator, the indicator indicates that there is no data in a buffer of the UE although the UE has data in the buffer, and
    wherein if the UE uses the PHR MAC CE for transmitting the indicator, the indicator indicates that there is no power headroom although the UE has a power headroom.

2. The method of claim 1, wherein the indicator is a buffer size field, which is set to 0, in the BSR MAC CE.

3. The method of claim 1, wherein the indicator is a power headroom field, which is set to 0, in the PHR MAC CE.

4. The method of claim 1, wherein the indicator is a new logical channel identifier (LCID), which indicates that the UL transmission is not available, in the at least one of the BSR MAC CE and the PHR MAC CE.

5. The method of claim 1, wherein the indicator is a new field, which indicates that the UL transmission is not available, in the at least one of the BSR MAC CE and the PHR MAC CE.

6. The method of claim 5, wherein the new field is set to 1.

7. The method of claim 1, wherein the UL transmission is not available when in-device coexistence (IDC) interference occurs.

8. The method of claim 1, further comprising:
triggering at least one of a BSR and a PHR;
receiving uplink radio resources from the base station through a UL grant; and
transmitting at least one of the BSR and the PHR to the base station through the uplink radio resources if it is determined that the UL transmission is available.

9. A user equipment (UE) in a wireless communication system, the UE comprising:
a radio frequency (RF) unit configured to transmit and receive a radio signal; and
a processor coupled to the RF unit and configured to:
determine whether an uplink (UL) transmission is available or not, and
if it is determined that the UL transmission is not available, transmit an indicator to a base station, using at least one of a buffer status report (BSR) media access control (MAC) control element (CE) and a power headroom report (PHR) MAC CE,
wherein if the UE uses the BSR MAC CE for transmitting the indicator, the indicator indicates that there is no data in a buffer of the UE although the UE has data in the buffer, and
wherein if the UE uses the PHR MAC CE for transmitting the indicator, the indicator indicates that there is no power headroom although the UE has a power headroom.

10. The UE of claim 9, wherein the indicator is a new logical channel identifier (LCID), which indicates that the UL transmission is not available, in the at least one of the BSR MAC CE and the PHR MAC CE.

11. The UE of claim 9, wherein the indicator is a new field, which indicates that the UL transmission is not available, in the at least one of the BSR MAC CE and the PHR MAC CE.

12. The UE of claim 9, wherein the UL transmission is not available when in-device coexistence (IDC) interference occurs.

* * * * *